United States Patent

[11] 3,603,981

[72] Inventors David C. Rollenhagen
Urbana, Ill.;
Wolfgang J. Poppelbaum, Syracuse, N.Y.
[21] Appl. No. 865,297
[22] Filed Oct. 10, 1969
[45] Patented Sept. 7, 1971
[73] Assignee The United States of America as represented by the United States Atomic Energy Commission

[54] DIGITALLY CONTROLLED RAMP GENERATOR
3 Claims, 3 Drawing Figs.

[52] U.S. Cl. 340/347DA, 328/181, 235/197
[51] Int. Cl. H03k 13/02
[50] Field of Search 328/181–185; 307/263, 228; 340/347, 324 A, 172.5; 235/197, 198

[56] References Cited
UNITED STATES PATENTS

| | | | |
|---|---|---|---|
| 3,325,802 | 6/1967 | Bacon | 340/347 X |
| 3,363,235 | 1/1968 | Rhodes | 340/324 X |
| 3,500,470 | 3/1970 | Barker et al. | 340/324 |

*Primary Examiner*—Maynard R. Wilbur
*Assistant Examiner*—Charles D. Miller
*Attorney*—Roland A. Anderson

ABSTRACT: In response to the binary outputs of a register containing a binary number capacitive means are selectively connected to the output of a charging source to produce a ramp signal output having a slope proportional to the magnitude of the binary number. A coincidence circuit activates a discharge circuit connected to the capacitive means to terminate the ramp signal output in response to equality between the binary outputs of the register and the binary outputs of a counter accumulating the output of an adjustable clock pulse source.

Inventor
Wolfgang J. Poppelbaum
David C. Rollenhagen

Attorney

Inventors
Wolfgang J. Poppelbaum
David C. Rollenhagen
Attorney

Inventors
Wolfgang J. Poppelbaum
David C. Rollenhagen
Attorney

DIGITALLY CONTROLLED RAMP GENERATOR

CONTRACTUAL ORIGIN OF THE INVENTION

The invention described herein was made in the course of, or under, a contract with the United States Atomic Energy Commission.

BACKGROUND OF THE INVENTION

The present invention relates to signal generating devices and particularly to ramp or sawtooth signal generating devices wherein the slope and time duration of the ramp output signal are controlled by the magnitude of a digital number.

Among the various uses of ramp signal generating devices, its use with electron beam deflecting or scanning circuits in TV cameras or display devices is well known in the art. In certain camera or display devices, such as the commercial TV receiver, electron beam deflecting signals having constant slope and time duration are required. In other devices employing deflectable electron beams it is often required that the electron beam deflecting or scanning signals be variable. Examples of such devices are computer-driven cathode-ray tube displays and systems for reducing the bandwidth of video information transmission in which the scanning speed is varied according to the difference in information content between successive frames of video information. In such devices the parameter for controlling the electron beam deflecting or scanning speed is often in the form of a digital number.

It is therefore the general object of the present invention to provide a signal generating device for producing a ramp output signal having a slope and time duration responsive to the magnitude of a digital number applied to the input thereof.

SUMMARY OF THE INVENTION

In accordance with the invention a register means produces binary outputs representative of a first binary number stored therein for selectively connecting capacitive means to the output of a charging source to thereby produce a ramp output signal having a slope determined by the magnitude of the first binary number. Means are provided to compare the first number with a second binary number equal to the number of clock pulses generated by an adjustable source of clock pulses since the start of the ramp output signal and to terminate the ramp output signal responsive to equality between the first and second numbers thereby producing a ramp output signal having a slope and time duration responsive to the magnitude of the first binary number.

BRIEF DESCRIPTION OF THE DRAWINGS

A more complete understanding of the invention will best be obtained from consideration of the accompanying drawings in which.

PREFERRED EMBODIMENT OF THE INVENTION

Figure 1:
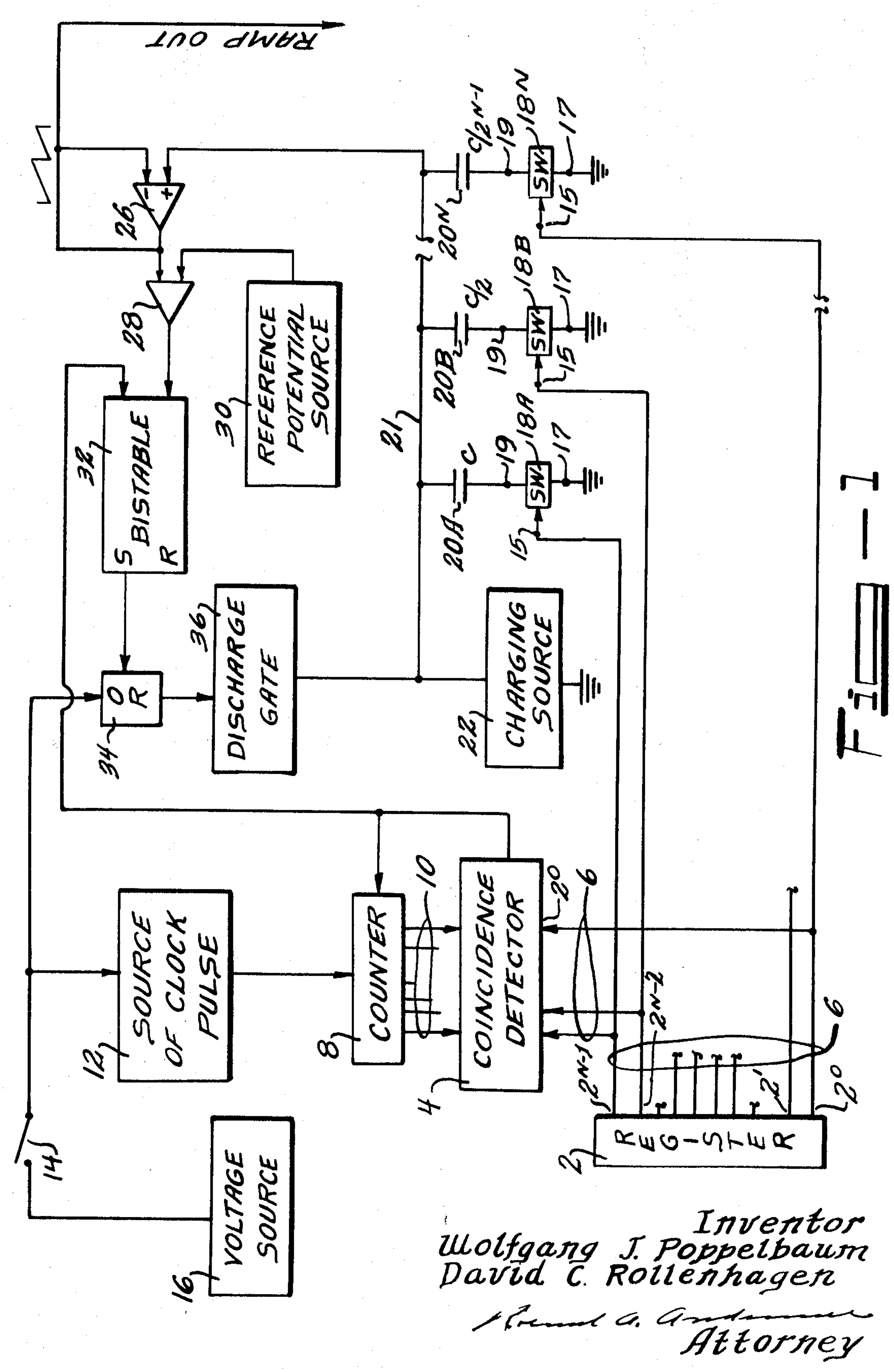
FIG. 1 is a block diagram of the digitally controlled ramp generator of the present invention.

Referring now to FIG. 1, an N-stage register 2 has its binary outputs connected to a first set of inputs of a coincidence detector 4 via a set of lines 6. A second set of inputs of coincidence detector 4 is connected, via a set of lines 10, to the binary outputs of an N-stage counter 8. The input of counter 8 is connected to the output of an adjustable source of clock pulses 12, such as an adjustable oscillator. A manual switch 14 has a first terminal connected to the output of a voltage source 16 and has a second terminal connected to a control input of the source of clock pulses 12 and a first input of an OR gate 34. The output of the coincidence detector 4 is connected to the set input of a bistable multivibrator 32 and to a clear input of counter 8.

The set of lines 6 also interconnect the binary output of each stage of the register 2 with the control input 15 of one of a set of N electronic switches 18A through 18N. Each switch 18 has a first terminal 17 connected to a ground reference potential and a second terminal 19 connected to one side of a capacitor of a set of N capacitors 20A through 20N. In the closed and open positions of a switch 18 the associated capacitor and the ground reference potential are respectively connected and disconnected. The other side of the capacitors 20 are connected via a common line 21 to the output of a charging source 22, such as a conventional current source, the output of a discharge gate 36, and a first input of a conventional voltage follower 26. The output of the voltage follower 26 provides the ramp output signal of the present device and may be connected to the sweep circuit of a display device such as a CRT display. The output of the voltage follower 26 is also connected to a first input of a conventional differential comparator 28 and is fed back to a second input of the voltage follower 26. A second input of the differential comparator 28 is connected to the output of a reference potential source 30. The output of the differential comparator 28 is connected to the reset input of the bistable multivibrator 32. The set output of the bistable multivibrator 32 is connected to a second input of the OR gate 34 which has its output connected to a control input of the discharge gate 36.

The least significant stage ($2^{\circ}$) of the register 2 controls the insertion of capacitor 18N into the charging circuit of charging source 22, via switch 18N and one of lines 6. Similarly, successive higher order stages of the register 2 control the insertion of an associated capacitor 20 into the charging circuit of charging source 22. The most significant stage ($2^{N}$) of the register 2 controls the circuit insertion of capacitor 20A via switch 18A and one of lines 6.

The relationship between the capacitance values of the capacitors 20A through 20N is as follows. Capacitor 20N associated with the least significant stage ($2^{o}$) of the register 2 has a value of $C/2^{N11}$, where C is a predetermined capacitance value. The second least significant stage ($2^{1}$) of the register 2 is associated with a capacitor 20 having a value of $C/2^{N12}$. Similarly, successive higher order stages of the register 2 are associated with capacitors having capacitance values which increase by a factor of two. Capacitor 20A associated with the most significant stage ($2^{N11}$) of register 2 thus has a capacitance value of $C/2^{o}$ or C.

Figure 2:
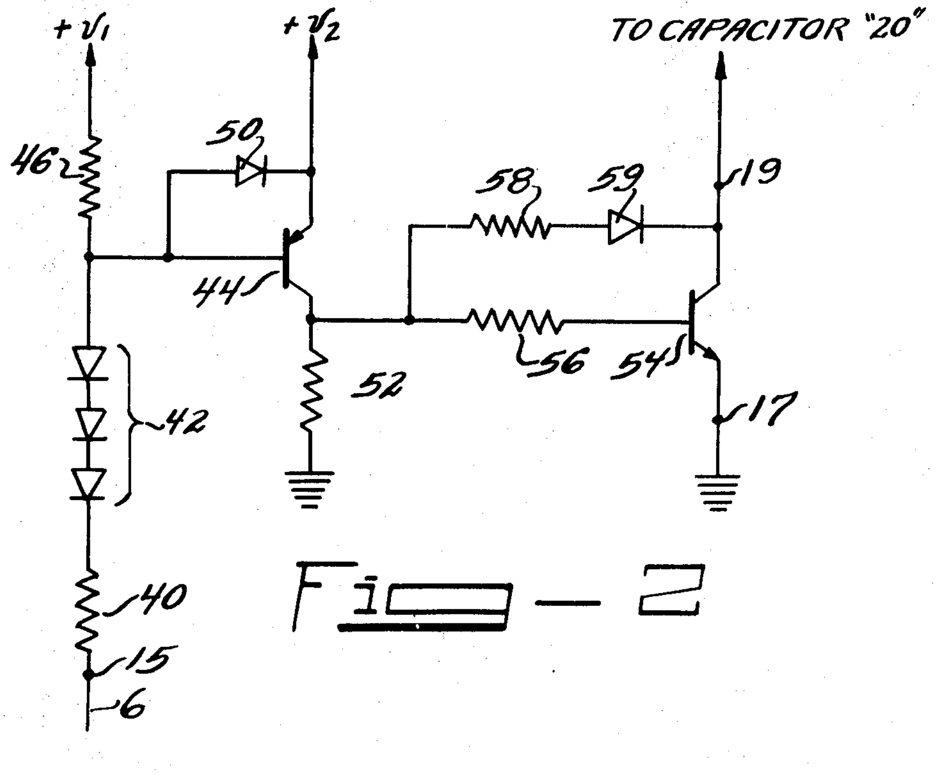
FIG. 2 is a circuit diagram of one of the electronic switch circuits employed in the device of FIG. 1.

A suitable electronic switch 18 for controlling the connection between the ground reference potential and one side of a capacitor 20 is shown in FIG. 2. One of the lines 6 is connected via the control terminal 15, a resistor 40 and series connected diodes 42 to the base terminal of a transistor 44. Suitable transistor bias voltage for transistor 44 is provided by resistor 46, diode 50 and constant potential sources $V_1$ and $V_2$. The collector of transistor 44 is connected to ground reference potential via a resistor 52 and to the base of a transistor 54 via a resistor 56. The emitter and collector of transistor 54 are respectively connected to ground reference potential and one side of a capacitor 20 via the switch terminals 17 and 19. Suitable transistor bias voltage for transistor 54 is provided by a resistor 58 and a diode 59. In operation of the switch, a first or negative voltage level on line 6 representative of a "one" in the associated stage of register 2 turns on both transistors 44 and 54 thereby providing a closed circuit between switch terminals 17 and 19. A second or positive voltage level on line 6 representative of a "zero" in the associated stage of register 2 turns off both transistors 44 and 54 thereby opening the circuit between switch terminals 17 and 19.

Figure 3:
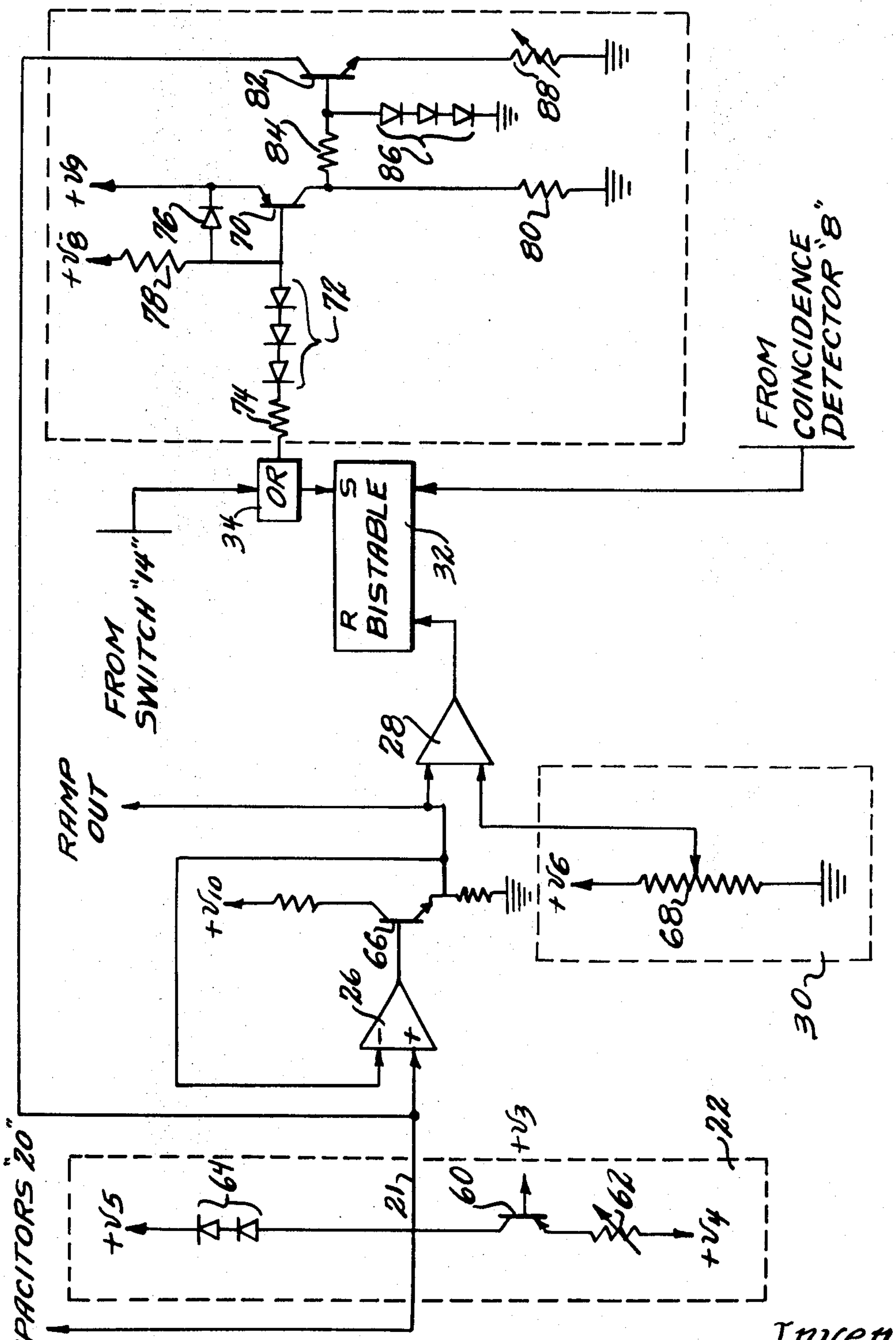
FIG. 3 is a more detailed diagram of the charging source, discharge means, and associated control circuits of the device of FIG. 1.

Referring now to FIG. 3, a suitable charging source 22 comprises a transistor 60 with its base terminal connected to a constant potential source $V_3$, with its emitter terminal connected to a constant potential source $V_4$ via a variable resistor 62, and with its collector terminal connected to a constant potential source $V_5$ via a pair of series connected diodes 64.

The collector terminal of transistor 60 is also connected, via line 21, to each of the capacitors 20A through 20N and to a first input of the voltage follower 26. The output of the voltage follower 26 is connected via emitter follower 66 to a first input of the differential comparator 28, and is fed back to a second input of the voltage follower 26. The source of reference potential 30 in FIG. 1 comprises a potentiometer 68 with its stationary contacts connected across a source of potential $V_6$ and ground reference potential, and with its movable contact connected to the second input of differential comparator 28. As noted above in the description of FIG. 1, the bistable multivibrator 32 has its set and reset inputs respectively connected to the outputs of coincidence detector 6 and the differential comparator 28. The set output of the bistable multivibrator 22 is connected, via OR gate 34, to the input of the discharge gate illustrated in dashed block 28. A first transistor 70 has its base terminal connected to the set output of the bistable multivibrator 32 via series connected diodes 72 and a resistor 74. Suitable transistor bias voltage is provided by diode 76, resistor 78 and constant potential sources $V_8$ and $V_9$. The collector of transistor 70 is connected to a ground reference potential via a resistor 80 and to the base of a second transistor 82 via a resistor 84. Suitable bias voltage for transistor 82 is provided by series connected diodes 86 and adjustable resistor 88. The collector terminal of transistor 82 is connected to the collector terminal of transistor 60 via the common line 21.

Referring now to FIGS. 1 and 3, operation of the device is as follows.

With switch 14 in the closed position, a binary number representative of the desired slope and time duration of the ramp signal to be generated is manually inserted into register 2. Each stage of the register 2 containing a "one" produces a first or negative voltage level which closes an associated switch 18 via one of lines 6. Each stage of the register 2 containing a "zero" produces a second or positive output level, via one of lines 6, which leaves an associated switch 18 in the open position. Each closed switch 18 connects an associated capacitor 20 between the charging source 22 and ground reference potential via switch terminals 17 and 19. Thus, for example, if $N$=4, and the binary number inserted into register 2 is 1001, then only capacitors 20A and 2ON with capacitance values of C and $C/2^{N11}$, respectively, are connected in parallel between the output of the charging source 22 and ground reference potential. The capacitors having the capacitance values of $C/2^2$ and $C/2^3$ and respectively associated with the second and third least significant stages ($2^1$ and $2^2$) of the register 2 are left disconnected from ground reference potential and are thus effectively disconnected from the ramp signal generating circuit.

In the closed position of switch 14 a negative voltage level is applied to the OR gate 34 and to a control input of the source of clock pulses 12 to inhibit the issuance of clock pulses at the output thereof. The OR gate 34 passes the negative voltage level and activates discharge gate 36 by turning on transistor 70 in FIG. 3. When transistor 70 turns on a positive voltage level at the collector thereof turns on transistor 82 to apply ground reference potential to both sides of the selected capacitors 20 via resistor 88, common line 21, and closed switches 18.

When switch 14 is opened, and with bistable multivibrator in the "reset" state, discharge gate 36 is deactivated and the selected capacitors 20 connected between the output of the charging source 22 and ground reference potential are charged by the charging source 22 thereby producing a ramp signal at the output of the emitter follower 66 in FIG. 3 via common line 21 and voltage follower 26. Since the capacitance values of the capacitors 20 are weighted according to the numerical value assigned to the binary digits in the associated stages of register 2, the slope of the generated ramp signal is thus proportional to the magnitude of the binary number in register 2.

Simultaneously with the deactivation of discharge gate 36 and the start of the generated ramp signal, clock pulses from source of clock pulses 12 commence advancing counter 8 from an initial count of zero. Upon equality between the binary number inserted in register 2 and the accumulated count in counter 8, coincidence detector 6 produces an output pulse which clears counter 8 to the count of zero and sets the bistable multivibrator 32. The set state of bistable multivibrator 32 produces a negative voltage level which activates discharge gate 36, via OR gate 34, thereby terminating the generated ramp signal by discharging the selected capacitors 20. With the source of clock pulses 12 adjusted to produce a stream of equally spaced clock pulses at a desired frequency, such as the standard horizontal line frequency of 15,750 hertz employed in commercial television practice, the time duration of the generated ramp signal is thus proportional to the magnitude of the binary number inserted in register 2, since the total number of clock pulses required to obtain coincidence is equal to the magnitude of the number in register 2. During discharge of the selected capacitors 20, the output of emitter follower 66 is continuously monitored by differential comparator 28. When the voltage level to which the selected capacitors 20 have discharged equals the voltage output of the potentiometer 68 in the reference potential source 30, the differential comparator produces an output pulse which resets bistable multivibrator 32, thereby deactivating discharge gate 36. The generation of the next ramp signal now repeats as described hereinbefore. The generation of the ramp signals may be stopped to allow insertion of different binary number in register 2 by closing switch 14 thereby activating discharge gate 36.

The discharge time of the selected capacitors 20 may be varied by adjusting the variable resistor 88 in the emitter circuit of transistor 82 in FIG. 3.

Although the particular embodiment of the present invention described above employs a manual switch 14 and the binary number is manually inserted into register 2, it is to be noted that an external source of binary data, such as a digital computer, may be connected to the input of the register 2. The switch 14 and the voltage source 16 are then replaced with a control line from the digital computer to supply the required inhibit and enable levels to the control inputs of the discharge gate 36, via OR gate 34, and the source of clock pulses 12 in synchrony with the parallel transfer of an N-bit binary number from the computer output to the register 2. In addition, the coincidence detector 6 output is then connected to the appropriate computer control circuitry to signal the termination of a generated ramp signal.

Persons skilled in the art will, of course, readily adapt the general teachings of the invention to embodiments other than the specific embodiment illustrated. Accordingly, the scope of the protection afforded the invention should not be limited to the particular embodiment shown in the drawings and described above, but shall be determined only in accordance with the appended claims.

The embodiments of the invention in which an exclusive property or privilege is claimed are defined as follows:

1. A variable ramp signal generator, comprising:
   - register means for storing a binary number and producing an output representative of the binary value of each digit of said binary member;
   - capacitive means having predetermined capacitance values;
   - a current source;
   - switch means responsive to the output of said register means for selectively connecting said capacitive means to said current source to charge said capacitive means, thereby producing said ramp signal;
   - a source of clock pulses;
   - counter means connected to said source of clock pulses for advancing said counter from a predetermined initial count and producing an output representative of the accumulated count therein;

coincidence means receiving the outputs of said register means and said counter means for producing an output pulse in response to equality therebetween;

control means for discharging said capacitive means in response to said output pulse, said control means including, a source producing a reference potential;

differential comparator means receiving said reference potential and the voltage across said capacitive means for producing an output pulse in response to equality therebetween;

bistable means including a first input for setting said bistable means to a first stable state in response to the output pulse of said coincidence means, a second input for setting said bistable means to a second stable state in response to the output pulse of said differential comparator means, and an output representative of said first stable state; and gating means connected to said capacitive means for discharging said capacitive means in response to said output of said bistable means.

2. The device according to claim 1 wherein said capacitive means comprises a plurality of capacitors having one side thereof connected in common to said charging source and having the other side thereof connected to one of said switch means.

3. The device according to claim 2 wherein said plurality of capacitors are each associated with one digit of said binary number and wherein each of said capacitors have capacitance values weighted according to the numerical value of the associated digits of said binary number.

UNITED STATES PATENT OFFICE
CERTIFICATE OF CORRECTION

Patent No. 3,603,981 Dated September 7, 1971

Inventor(s) David C. Rollenhagen and Wolfgang J. Poppelbaum

It is certified that error appears in the above-identified patent and that said Letters Patent are hereby corrected as shown below:

Col. 2, line 40, change "$N^{11}$" to --$N^{-1}$--.
line 42, change "$N^{12}$" to --$N^{-2}$--.
line 46, change "$N^{11}$" to --$N^{-1}$--.
Col. 3, line 45, change "$N^{11}$" to --$N^{-1}$--.

Signed and sealed this 6th day of June 1972.

(SEAL)
Attest:

EDWARD M.FLETCHER,JR.
Attesting Officer

ROBERT GOTTSCHALK
Commissioner of Patents